J. I. LINER & R. GRAHAM-WOODWARD.
MEANS FOR CALCULATING ELAPSED TIME VALUES.
APPLICATION FILED APR. 24, 1911.
1,069,964. Patented Aug. 12, 1913.
2 SHEETS—SHEET 1.
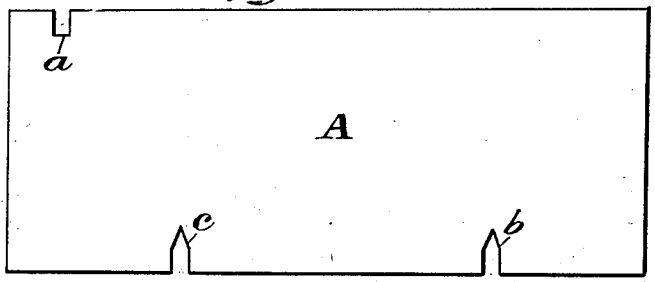
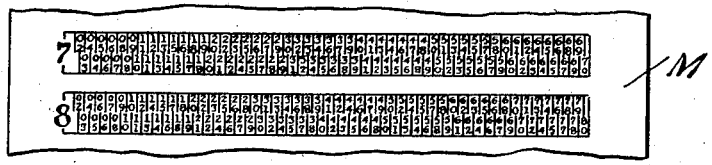
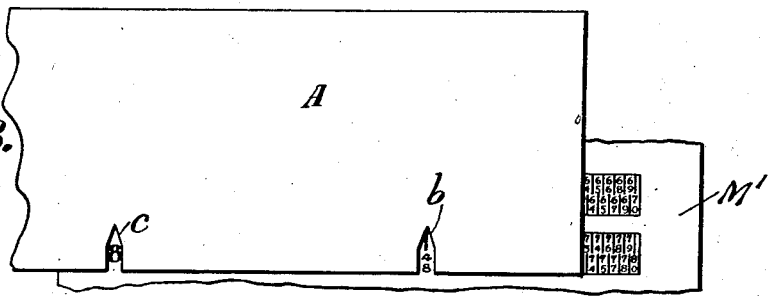
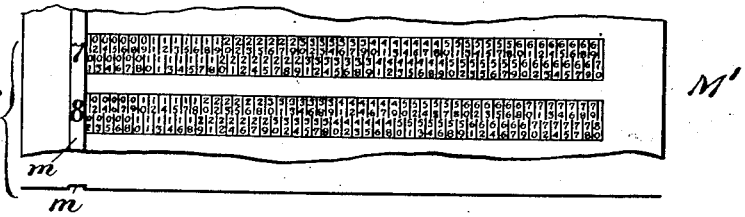
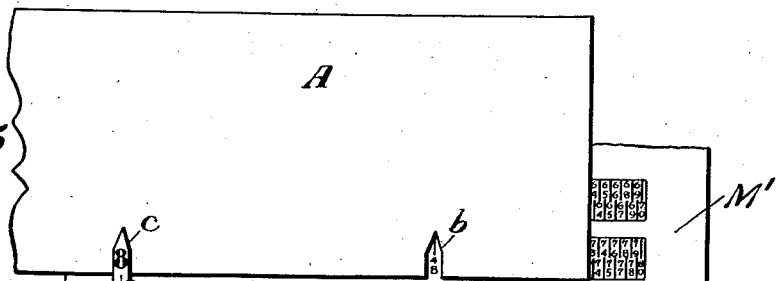

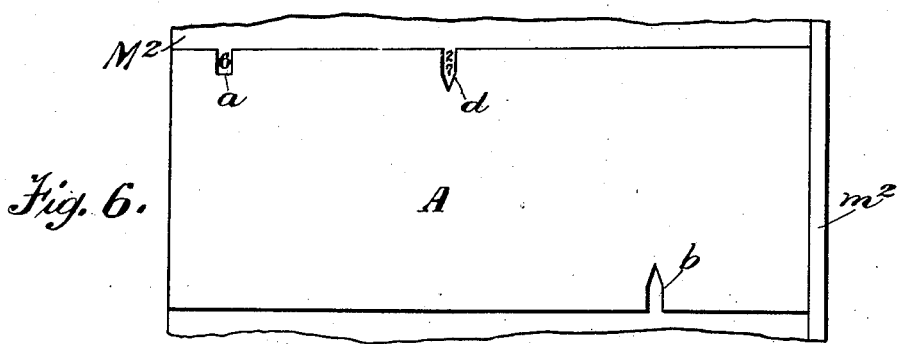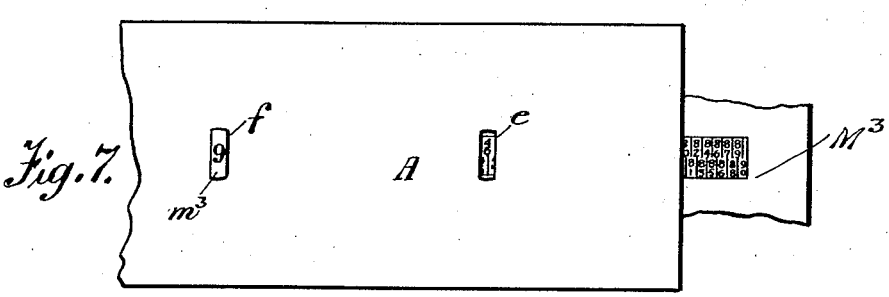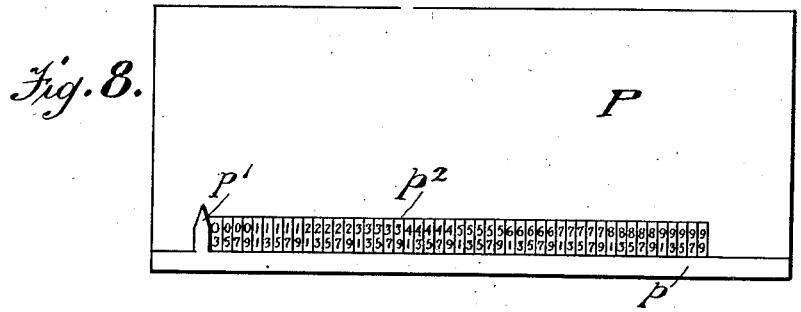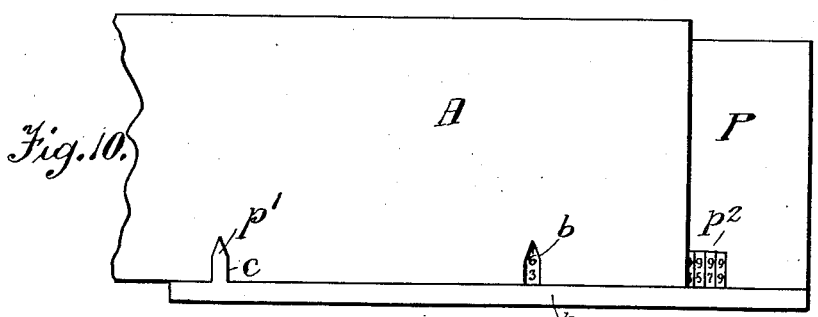

UNITED STATES PATENT OFFICE.

JOSEPH I. LINER AND ROBERT GRAHAM-WOODWARD, OF NEW YORK, N. Y., ASSIGNORS, BY DIRECT AND MESNE ASSIGNMENTS, TO LINER ELAPSED-TIME CALCULATOR CO., OF NEW YORK, N. Y., A CORPORATION OF NEW YORK.

MEANS FOR CALCULATING ELAPSED-TIME VALUES.

1,069,964.     Specification of Letters Patent.     Patented Aug. 12, 1913.

Application filed April 24, 1911. Serial No. 623,003.

*To all whom it may concern:*

Be it known that we, JOSEPH I. LINER, formerly a subject of the Emperor of Austria-Hungary, having declared my intention of becoming a citizen of the United States, and ROBERT GRAHAM-WOODWARD, a citizen of the United States, residents of the borough of Manhattan, city, county, and State of New York, have invented certain new and useful Improvements in Means for Calculating Elapsed-Time Values, of which the following is a specification.

In recording the working hours of employees and estimating the cost of producing manufactured articles of various kinds, it is a common practice to employ time recorders of various kinds for measuring and indicating the amount of time consumed by the workmen and machinery in producing work and utilize such records of time as a basis for calculating the cost of manufacture. The calculation of "cost" under this plan is objectionable first, because of the expense of employing a skilled accountant to reduce to figures the record of the time recorder, and second, because of the chances for inaccuracies in the necessary mental computations.

The object of the present invention is to simplify and improve the means for calculating the value in money or in hours of the time actually consumed in performing work, so as to reduce to a minimum the expense and mental effort required for ascertaining the cost of production in dollars and cents or in hours and minutes and eliminate the chances for error in such calculations. In accomplishing this object, we propose to employ a simple form of time check or ticket which is adapted to have indicated upon it by a suitable time measuring mechanism the measured "elapsed time" (that is, the actual time consumed in work after the idle or unproductive part of the time is eliminated), and a time value scale or schedule, worked out in dollars and cents, or in hours and minutes, for use with the properly marked check or ticket, to indicate at a glance the money value at any given rate or the time value of the "elapsed time" recorded upon the ticket.

In carrying out our invention, we prefer to employ a time check or ticket which is notched or punched by a time measuring mechanism to indicate by the distance separating the punch holes or notches the time elapsed in performing the work of which the money or time value is to be determined. Any suitable time recording mechanism may be employed in producing the time check or ticket which forms the basis of our present invention, but we prefer to employ the "elapsed time" recorder set forth in the application of Joseph I. Liner filed March 20, 1911, Serial No. 615,685. In combination with the properly marked time check or ticket, we propose to use a time value table or schedule showing in arithmetical progression the value in dollars and cents of any indicated "elapsed time" at any rate per hour, or the value of such indicated time in hours and minutes. Such time value table or schedule may be arranged to show increasing values in money at given rates or in time for any fractional parts of an hour, it being understood that the scale upon which said table or schedule is arranged must be based upon the same scale of time progression as the time measuring mechanism in order that the time measured distances between the ticket markings will correspond properly with the value divisions in the table or schedule.

With the marked check or ticket and the time or money value table or schedule prepared as explained, we place the check or ticket upon the table or schedule, with one notch exposing zero of a time scale or the rate per hour, of the workman or machine whose time has been measured and recorded, of a money scale, and the other notch exposing certain figures in the table or schedule. The exposed table or schedule figures will be the total value of the "elapsed time" marked upon the ticket, either in hours and minutes, or in dollars and cents, at the rate per hour charged for the particular workman or machine. By this means of first indicating "elapsed time" upon a check or ticket and then reading on a prepared time value table or schedule with the assistance of the punched check or ticket, we are able to determine at a glance the value in money or time of the "elapsed time" expended on the particular piece of work without the exercise of mental effort and without danger of error in calculation of the operator or time keeper. The indicated value of the "elapsed time" can be noted upon the check or ticket for future reference.

Our invention is susceptible of many modifications as to details in the means for calculating "elapsed time" values, and in the time check or ticket, and the "elapsed time" value table or schedule.

In order that our invention may be fully understood, we will first describe the same with reference to the accompanying drawings and afterward point out the novelty more particularly in the annexed claims.

In said drawings: Figure 1 is a face view of a time check or ticket having "elapsed time" indicated upon it by two punch marks. Fig. 2 is a detail face view of a part of a time value table or schedule prepared for carrying out our invention in conjunction with a marked check or ticket. Fig. 3 is a detail view showing the check or ticket of Fig. 1, in position upon the table or schedule of Fig. 2 for indicating the value of the measured "elapsed time." Fig. 4 is a view similar to Fig. 2 showing a slight modification of our invention in which the time value table or schedule is formed with a ticket positioning rib. Fig. 5 is a view similar to Fig. 3 showing the check or ticket in position upon the table or schedule of the form shown in Fig. 4. Fig. 6 is a view similar to Fig. 3 showing a further modification embodying a differently arranged ticket positioning rib or flange. Fig. 7 is a similar view illustrating a time value table or schedule with ticket positioning lugs adapted to coöperate with a time check or ticket having the measured time indicated by punch markings in the interior of the ticket. Fig. 8 is a view similar to Fig. 4 showing a further modification in which an "elapsed time" scale is arranged upon a flanged base to enable the operator to determine at a glance the amount of time indicated by the notched check or ticket. Fig. 9 is an edge view of the device shown in Fig. 8, and Fig. 10 is a view similar to Fig. 7 showing the punched check or ticket in position upon the time value scale shown in Fig. 8.

Referring to the drawings, Fig. 1 shows at A a time check or ticket of the form which we prefer to employ in carrying out our invention. The ticket A is a blank oblong sheet or strip of heavy paper or cardboard formed in one edge with a square gaging notch $a$ for coöperation with the gaging rib of the ticket positioning cylinder of the Liner time recorder constructed as set forth in the application of Joseph I. Liner Serial No. 615,685 filed March 20th, 1911. This time recorder forms no part of our present invention, but it or some other suitable form of time recording mechanism is necessary to indicate upon a check or ticket "elapsed time" to be valued according to our invention. Said Liner time recorder comprises a clock-operated ticket gaging or positioning device in the form of a rotatable cylinder or disk carrying upon its face a spiral ticket gaging rib, and a ticket marking punch mounted in fixed relation to said gaging device so that a time check or ticket such as indicated at A may be placed upon the ticket support with the notch indicated at $a$ in engagement with the spiral rib to present the ticket in certain timed relation to the marking punch. At the commencement of a piece of work which is to be timed, the check or ticket A is placed in the machine in the manner described, and the time of starting punch mark is made as indicated at $b$. After the completion of the work, the check or ticket is again placed in the recording machine and another punch mark made in the check or ticket, such as indicated at $c$. The time which has passed between the beginning and ending of the work causes the shift in position of the gaging device so as to present the check or ticket in the two shifted positions for receiving the described punch marks. Since the two shifted positions bear a definite relation to the time consumed in the work, it will be clear that the distance between the two punch marks $b$ and $c$ is a measure upon a proper scale of the "elapsed time" consumed in performing the work, particularly in view of the fact that the Liner time recorder referred to includes means for eliminating from a time record an idle part of a day.

In combination with the check or ticket A having a time record indicated upon it in the manner described, we propose to employ a time value table or schedule for indicating at a glance the value of the "elapsed time" marked upon the check or ticket either in hours and minutes for determining the length of time spent by the workman or machine, or in dollars and cents to show the cost in money at a certain rate per hour, of the particular workman or machine.

In Fig. 2 we have illustrated at M a section of a money value table or schedule. The section of the table or schedule shown includes the progressive money values in fractions of an hour at the rates of seven and eight cents per hour. The tables are arranged on a scale of tenths of an hour and the scale for each rate is shown worked out for ten hours. While the section of the table or schedule for the seven and eight cent hourly rates only are shown, it will be understood that this is only illustrative of the principle involved and that a complete table or schedule is intended to be used showing the full set of scales of the various hourly rates in use in the particular establishment employing the invention.

In Fig. 3 of the drawings, we have shown a punched time check or ticket A in reading position upon the money value table or schedule M. In the illustration, the rate of the workman or machine whose time has been marked upon the check or ticket A is eight cents per hour so that in placing the ticket upon the table or schedule the punch mark $c$ is arranged to expose the hourly rate "8" with the result that the other punch mark $b$ will expose to view the amount "48" which is the money value of the "elapsed time" of the particular workman or machine indicated by the punched check or ticket. In this manner the money value of the time consumed is ascertained at a glance. To confine the money value scales within convenient scope, we have arranged the progressive values in columns of alternating figures side by side. The punch markings upon the time check or ticket are of sufficient depth or length to extend across the width of the columns of figures so that by a slight shifting of the time check or ticket upon the value table or schedule with the rate per hour figure exposed, the indicated or value figures in the scale can be readily observed in either of the columns.

In Fig. 4 we have shown a section of a slightly modified form of time value table or schedule M'. The rate scales upon this form of table or schedule are the same as shown in Fig. 2, but to facilitate the rapid and accurate placing of the punched time check or ticket upon the table or schedule, we form the latter with a rib or projection $m$ extending longitudinally of the table or schedule and transversely of the columns of scale figures. This rib $m$ is preferably formed by embossing the card or sheet upon which the table or schedule is printed, although it may be in the form of a separate strip of any suitable material suitably attached to the body of the table or schedule. The drawing shows the rib formed by embossing the material of the card or sheet upon which the table or schedule is printed.

In Fig. 5, we have shown a time check or ticket A such as hereinbefore described, placed in position upon the modified form of table or schedule M', with the side walls of the punched notch $c$ engaging the embossed rib $m$ and exposing the rate of eight cents per hour in the notch. The other notch $b$ exposes the total value of the indicated time which in the instance illustrated is forty-eight cents.

In Fig. 6 we have shown a further modification of our invention in which the time value table or schedule $M^2$ is provided at one edge with a positioning flange or rib $m^2$. The time value scales for the different hourly rates are arranged exactly as hereinbefore described with reference to Fig. 2 of the drawings. In utilizing this form of table or schedule it is necessary to punch-mark the check or ticket upon a different plan as explained in the above named application of Liner, Serial No. 615,685. In marking the time check or ticket A for this form of table or schedule, the first punch mark $b$ at the commencement of the operation which is to be timed, is made in the same manner as the first punch mark $b$ in the form of check or ticket shown in Fig. 1. At the completion of the work, however, the check or ticket is placed in the Liner time recorder in reversed position, with the time of starting punch mark $b$ in engagement with the gage rib of the ticket-positioning cylinder. This places the edge of the ticket containing the gage notch $a$ away from the positioning cylinder and in the zone of operation of the ticket marking punch. With the ticket so positioned in the machine, a second punch mark indicated at $d$ is made in the edge of the ticket and by the relation of the punch markings upon the ticket, it will be clear that the distance between the gage notch $a$ and the final punch mark $d$ will indicate upon the proper scale the "elapsed time" consumed in performing the work which has been measured. With the ticket punched in this manner, it will further be understood that the hourly rate figures along the left hand edge of the time value table or schedule $m^2$ (one of which is exposed in the notch $a$) can be exposed in the gage notch $a$ by placing the punched check or ticket with its un-notched end in engagement with the guide flange or rib $m^2$. This position of the ticket upon the table or schedule $M^2$ will always expose a rate value figure because of the constant length of the ticket and the arrangement of the notch $a$ at the same distance from the unpunched end of the ticket as the distance of the line of hourly rate figures from the face of the gage flange or rib $m^2$. The zero of each hourly rate scale being in the line of the hourly rate figures, it will of course be understood that the figures exposed by the punch notch $d$ will be the total value at the selected hourly rate of the "elapsed time" indicated by the punched ticket.

It will be understood with reference to the form of value table or schedule shown in Fig. 6 of the drawings that an "elapsed time" value scale in hours and minutes can be arranged upon this plan in place of the money value scale shown. Such an hour scale would be arranged in fractions of an hour beginning with zero in the line of the scale in the form shown in the drawings and increasing in fractions of an hour upon the same divisional scale as illustrated in a line extending to the right of the zero mark. The ticket marked as explained, would show "elapsed time" between the gage notch $a$ and the time of completion notch $b$ so that when the ticket is properly placed upon the hour table or schedule, the notch $d$ would expose the proper numerals to indicate in hours and minutes the time marked upon the ticket.

In Fig. 7 of the drawings, we have shown a slight further modification in which the value table or schedule $M^3$ is formed along its left hand edge with a series of separate lugs or projections $m^3$ upon the exposed faces of which are printed the hourly rate figures. With this form of scale, we employ a time check or ticket indicated at $A'$ having the time of starting punch mark $e$ and the time of completion punch mark $f$ formed in the body of the ticket by any suitable time recorder. In reading the value of "elapsed time" indicated by such a ticket, it will be observed that one of the punch marks, such as $f$, is fitted over the oblong lug or projection $m^3$ with the ticket extending to the right over the value table or schedule so that the other punch mark $e$ will expose certain value figures on the scale. In the illustration, the numerals 46 are exposed, indicating the value of 46 cents for the "elapsed time" indicated upon the time check or ticket. In this form of value table or schedule, it will be understood that there is a projecting lug or boss $m^3$ at the left hand end of each rate scale of the table or schedule. The form of time check or ticket shown in Fig. 1 may also be used in connection with this form of time value table or schedule, the notch $c$ being adapted to fit upon the bosses or lugs $f$ to place the other notch $b$ in position to expose the time value figures upon the proper scale. In place of the lugs or bosses $f$ in the form shown, other forms of projections may be employed for positioning the time check or ticket upon the table or schedule. For instance, such ticket positioning lugs may be in the form of pins or small projections mounted in the support for the table or schedule.

In Figs. 8, 9 and 10 of the drawings, we have shown a further modification of our invention for indicating "elapsed time" values in hours and fractions of hours. In this embodiment of the invention, a ticket supporting plate indicated at P is provided along its bottom edge with a rib or flange $p$ and adjacent to one end of said rib or flange is a gage lug $p'$ shaped to accurately fit one of the punch markings of the time recorder. Arranged upon the plate just above the flange or rib $p$ is a fractional hour scale $p^2$ showing in the upper horizontal column "elapsed time" in hours and in the lower column, fractions of hours. This hour value scale is worked out in tenths of an hour with each division indicating two-tenths of an hour. The upper horizontal column of hour numerals are repeated in the several divisions of the scale between completed hours to assist in reading the final result. In Fig. 10 a time check or ticket A of the same form as shown in Figs. 1 and 3 of the drawings is represented in position upon the hour value table or schedule. The lower edge of the ticket rests upon the flange $p$ with the time of finishing punch mark $c$ in engagement with the positioning lug $p'$. This so places the ticket that the time of starting punch mark $b$ exposes the numerals 6 and 3, which under the plan of the scale, will be understood to mean that the "elapsed time" indicated by the punch markings on the ticket is six hours and three-tenths, or if it is desired to reduce it to hours and minutes, six hours and eighteen minutes.

The punch markings of the time check or ticket embodying the present invention may be marginal notches or interior openings or perforations, and since such notches or perforations are subsequently employed in connection with the time value table or schedule for interpreting the time value marks upon a ticket, and each notch or perforation is so formed and located in the ticket that it will expose an individual value division of the time value table or schedule, such ticket markings are hereinafter referred to in the claims as "sight notches or perforations." Incidental to the exposure of individual numbers in the table or schedule, is the obscuring of parts of the table or schedule by the imperforate part of the check or ticket between the notches or perforations.

While it is desirable in some cases to have a distinctive hour scale for indicating in hours and fractions of hours the "elapsed time" indicated upon a marked check or ticket, it will be understood that the hour value scale worked out in fractions of tenths of an hour is the same as the money value scale at the rate of ten cents per hour, and that said ten cent rate scale can therefore be used for determining the hours and fractions of hours indicated by a particular time check or ticket.

We desire to claim broadly in the present application the means by which elapsed time values are determined, consisting of a properly marked time check or ticket and a time value table or schedule prepared upon a fractional scale to agree with the time markings upon the check or ticket. In addition to this broad idea, we desire to claim such time value table or schedule with mechanical means for accurately and conveniently positioning a marked time check or ticket upon the time value table or schedule to facilitate reading the values marked upon the tickets.

What we claim is:

1. The combination of a time check or ticket, having upon it an indicated space representing "elapsed time," with a time value table or schedule, and mechanical means for positioning said check or ticket upon said table or schedule.

2. The combination of a time check or ticket having "elapsed time" indicated upon it by the distance apart of suitable marks, with a time value table or schedule, and mechanical means for positioning said marked check or ticket upon said table or schedule.

3. The combination of a time check or ticket, having upon it an indicated space representing "elapsed time," with a time value table or schedule, and a projection upon said table or schedule adapted to engage and position said check or ticket thereon.

4. The combination of a time check or ticket having "elapsed time" indicated upon it by the distance apart of suitable marks, with a time value table or schedule having a projection adapted to engage and position said check or ticket upon said table or schedule.

5. The combination of a time check or ticket having "elapsed time" indicated upon it by the distance apart of suitable notches or perforations, with a time value table or schedule having a ticket positioning projection adapted to engage a notch or perforation in said check or ticket to assist in locating the check or ticket upon said table or schedule.

6. The combination of a time check or ticket having "elapsed time" indicated upon it by the distance apart of suitable marginal notches, with a time value table or schedule having a flange or rib adapted to engage one of said ticket notches for positioning said check or ticket upon said table or schedule, and rate numerals upon said flange or rib arranged to be exposed in the notch engaged upon the flange or rib.

JOSEPH I. LINER.
ROBERT GRAHAM-WOODWARD.

Witnesses:
FRANK J. SHIPMAN,
CLARENCE J. FRAISSINETH.